US009003045B2

(12) United States Patent
Berry et al.

(10) Patent No.: US 9,003,045 B2
(45) Date of Patent: *Apr. 7, 2015

(54) RECEIVING AN UNLIMITED NUMBER OF DATA ITEMS MODIFIED BY A WEB TRANSACTION

(71) Applicant: International Business Machines Corporation, Armonk, NY (US)

(72) Inventors: Charles F. Berry, Apalachin, NY (US); Glenn C. Godoy, Endwell, NY (US); Nitin Jhingan, Vestal, NY (US); Amy J. Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/866,113

(22) Filed: Apr. 19, 2013

(65) Prior Publication Data
US 2013/0232196 A1   Sep. 5, 2013

Related U.S. Application Data

(63) Continuation of application No. 12/277,771, filed on Nov. 25, 2008.

(51) Int. Cl.
*G06F 15/16* (2006.01)
*H04L 29/06* (2006.01)
*H04L 29/08* (2006.01)

(52) U.S. Cl.
CPC ............... *H04L 67/42* (2013.01); *H04L 67/14* (2013.01); *H04L 67/02* (2013.01); *H04L 67/142* (2013.01)

(58) Field of Classification Search
CPC ....................................................... H04L 67/14
USPC .......................................................... 709/227
See application file for complete search history.

(56) References Cited

U.S. PATENT DOCUMENTS 6,108,703 A   8/2000 Leighton et al.
6,553,413 B1   4/2003 Leighton et al.
(Continued)

OTHER PUBLICATIONS

Berners-Lee et al. Uniform Resource Locators (URL). The Internet Engineering Task Force, Network Working Group. Request for Comments: 1738, Category: Standards Track. Dec., 1994. [online]. 24 pages. [retrieved on Nov. 14, 2008]. Retrieved from the Internet: < URL: http://www.ietf.org/rfc/rfc1738.txt?number=1738>.
(Continued)

*Primary Examiner* — Andrew Georgandellis
(74) *Attorney, Agent, or Firm* — Schmeiser, Olsen & Watts, LLP; John R. Pivnichny (57) ABSTRACT

A system and associated method for receiving an unlimited number of data items modified by a Web transaction. A processor requests a service from a Web-service program by sending the service program a set of data items and a client identifier. The Web-service program responds with a Web-interface program identifier and a user session identifier. The processor uses the session identifier, the Web-interface program identifier, and a storage location of the data items to open a session with a Web-interface program, during which the processor directs the Web-interface program to modify the data items and store them on a data storage device without interacting with the Web-service program. When the user session terminates, the processor requests from the Web-service program the modified data items and the Web-service program sends the data items to the processor without involvement of the Web-interface program.

15 Claims, 7 Drawing Sheets

(56) References Cited

U.S. PATENT DOCUMENTS

| | | | |
|---|---|---|---|
| 6,957,390 B2 | 10/2005 | Tamir et al. | |
| 7,069,267 B2 | 6/2006 | Spencer, Jr. | |
| 7,103,645 B2 | 9/2006 | Leighton et al. | |
| 7,272,625 B1 | 9/2007 | Hannel et al. | |
| 7,516,195 B2 * | 4/2009 | Collet et al. | 709/218 |
| 2006/0265720 A1 | 11/2006 | Cai et al. | |
| 2008/0270709 A1 | 10/2008 | Smits et al. | |
| 2010/0131655 A1 | 5/2010 | Berry | |

OTHER PUBLICATIONS

Office Action (Mail Date Sep. 15, 2010) for U.S. Appl. No. 12/277,771; Filing Date Nov. 25, 2008; Art Unit 2453; Confirmation No. 6641.

Amendment filed Dec. 15, 2010 in response to Office Action (Mail Date Sep. 15, 2010) for U.S. Appl. No. 12/277,771; Filing Date Nov. 25, 2008; Art Unit 2453; Confirmation No. 6641.

Final Office Action (Mail Date Mar. 2, 2011) for U.S. Appl. No. 12/277,771; Filing Date Nov. 25, 2008; Art Unit 2453; Confirmation No. 6641.

Amendment After Final filed Mar. 29, 2011 in response to Final Office Action (Mail Date Mar. 2, 2011) for U.S. Appl. No. 12/277,771; Filing Date Nov. 25, 2008; Art Unit 2453; Confirmation No. 6641.

Advisory Action (Mail Date Apr. 13, 2011) for U.S. Appl. No. 12/277,771; Filing Date Nov. 25, 2008; Art Unit 2453; Confirmation No. 6641.

Request for Continued Examination filed Apr. 21, 2011 in response to Advisory Action (Mail Date Apr. 13, 2011) for U.S. Appl. No. 12/277,771; Filing Date Nov. 25, 2008; Art Unit 2453; Confirmation No. 6641.

Notice of Allowance (Mail Date Dec. 17, 2012) for U.S. Appl. No. 12/277,771; Filing Date Nov. 25, 2008; Art Unit 2453; Confirmation No. 6641.

* cited by examiner

EXAMPLE OF CAM USER SESSION DATA:
TCAM_USER_SESSION

| E01 CAMUS Id |
|---|
| E11 CAMUS_Web_Id |
| E12 CAMUS_Locale_Cd |
| E13 CAMUS_Lang_Cd |
| E14 AcctPurp_Cd |
| E15 InstAppl_Id |
| E16 Doc_Key |
| E17 CAMUS_Status_Cd |
| E18 CAMUS_CompAct_Cd |

FIG. 3

FIG. 4

RECEIVING AN UNLIMITED NUMBER OF DATA ITEMS MODIFIED BY A WEB TRANSACTION This application is a Continuation application Claiming Priority to Ser. No. 12/277,771, filed Nov. 25, 2008.

FIELD OF THE INVENTION

The present invention discloses a system and associated method for effectively transferring large amount of data between a user program and a web application servicing complex transactions for the user program.

BACKGROUND OF THE INVENTION

Conventional client program of a web application transfers data gathered by user inputs within a Uniform Resource Locator (URL). Data within the URL, however, are limited in the amount of data to be transferred, thus the data transferring method of conventional client program cannot support a web application demanding bidirectional transfers of large amount of data such as a sizable document and/or extensive information.

Thus, there is a need for a system and associated method that overcomes at least one of the preceding disadvantages of current methods and systems for transferring data between web applications.

SUMMARY OF THE INVENTION

The present invention provides a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a computer program product, comprising a computer usable medium having a computer readable program code embodied therein, said computer readable program code containing instructions that when executed by a processor of a computer system implement a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a computer system comprising a processor and a computer readable memory unit coupled to the processor, said memory unit containing instructions that when executed by the processor implement a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for transferring data for a web application, the method performed by a client program comprising:

sending, to a web service program, a first request to establish a user session for a web interface program, wherein the first request comprising an input document of the client program and a return address, wherein a user of the client program interacts with the web interface program during the user session, wherein the data is stored in a data store accessed by the web service program and the web interface program;

in response to the first request, receiving, from the web service program, a first response comprising a session identifier and an interface address, wherein the session identifier corresponds to the user session, wherein the interface address indicates a Uniform Resource Locator (URL) of the web interface program;

operating the user session by channeling interactions by the user of the client program to the web interface program indicated by the interface address for the user session;

upon termination of the user session by the user of the client program, sending, to the web service program, a second request to retrieve the data resulting from the user session; and in response to the second request, acquiring the data from the web service program.

The present invention provides a method and system that overcomes at least one of the current disadvantages of conventional method and system for transferring large amount of data between web applications.

DETAILED DESCRIPTION OF THE INVENTION

Figure 1:
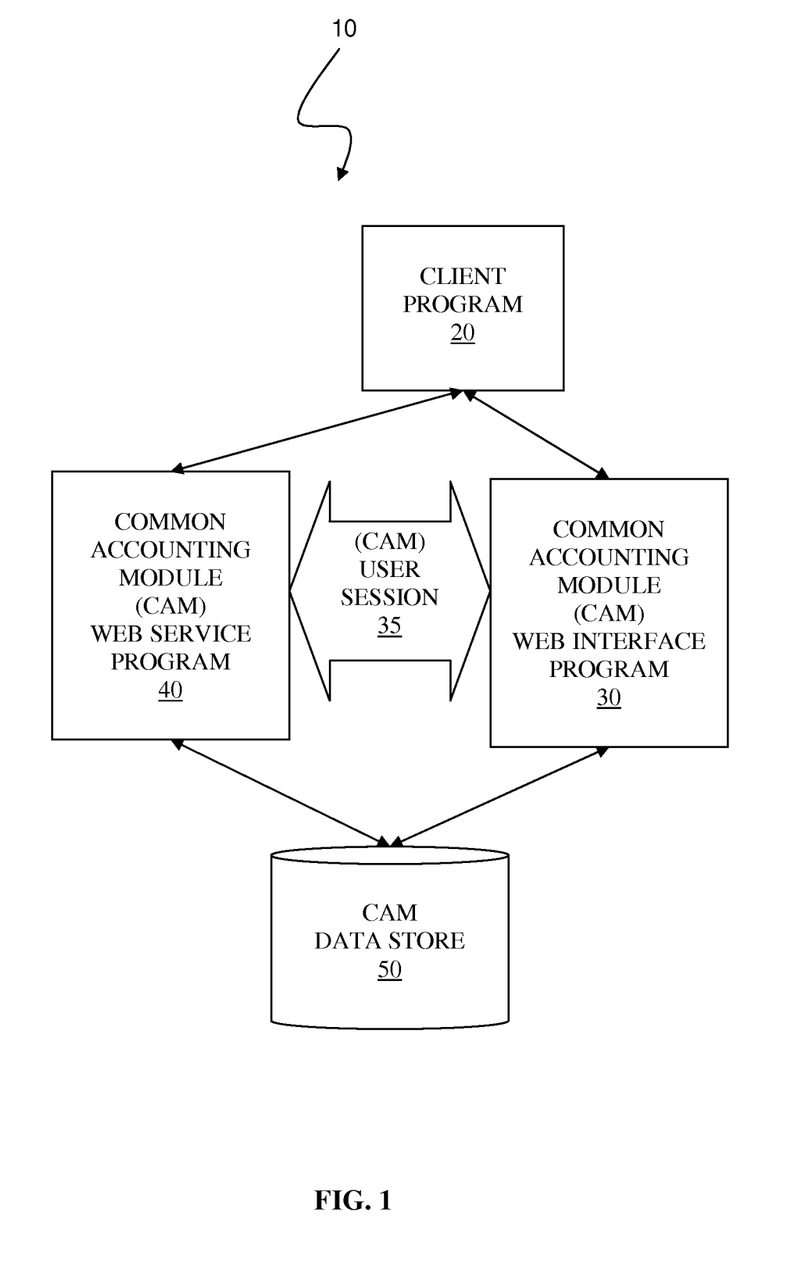
FIG. 1 illustrates a system for transferring large amount of data in a web service transaction, in accordance with embodiments of the present invention.

FIG. 1 illustrates a system 10 for transferring large amount of data in a web service transaction, in accordance with embodiments of the present invention.

The system comprises a client program 20, a CAM web interface program 30, a CAM web service program 40, and a CAM data store 50.

The client program 20 is a web application program that employs services provided by the CAM web service program 40. The client program 20 executes a RequestSession web service call that requests the CAM web service program to establish a CAM user session 35 and that transmits information necessary for the CAM user session 35 to the CAM web service program 40. During the CAM user session 35, a user of the client program 20 interactively creates and stores data in the CAM data store 50. Upon concluding the CAM user session 35, the client program 20 acquires accounting data from the CAM web service program 40 in response to executing a GetSessionResult web service call. See description of FIG. 2, infra, for details of the web service calls.

The CAM web interface program 30 guides the user interactively through creation of a set of complete, valid accounting data. The CAM web interface program 30 operates independently from the CAM web service program 40 in storing accounting data in the CAM data store 50.

The CAM web service program 40 establishes the CAM user session 35 in response to the RequestSession web service call. The CAM web service program 40 also compiles results of the CAM user session 35 and returns to the caller application 20 in response to the GetSessionResults web service call.

The CAM data store 50 comprises accounting data necessary to perform services of the CAM web service program 40 and the CAM web interface program 30. In one embodiment of the system 10, the CAM data store 50 comprises a purchase document received from the client program 20 and accounting data that are modified by the CAM web interface program 30 pursuant to requests from the user of the client program 20 during the CAM user session 35.

Figure 2:
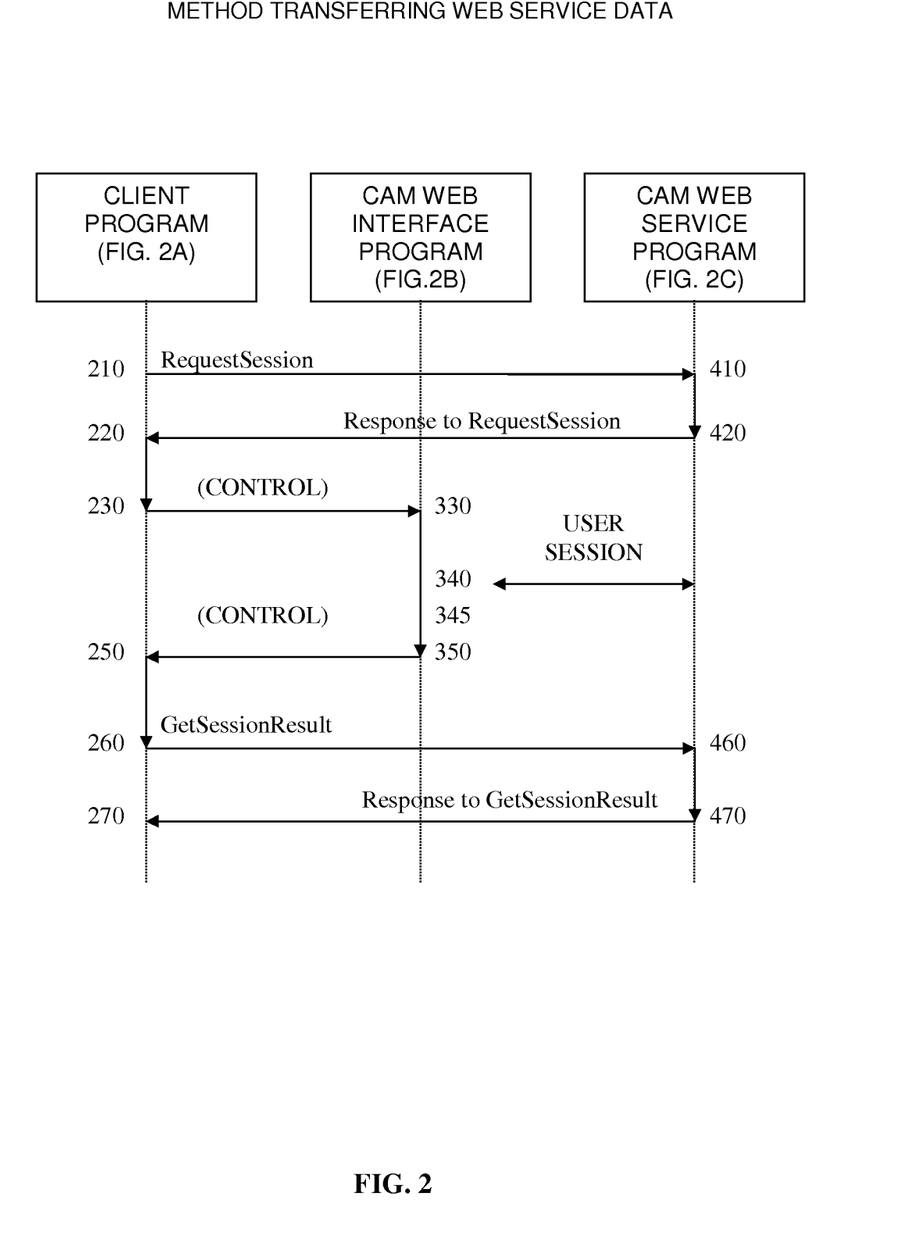
FIG. 2 is a control flow chart describing how the client program, the Common Accounting Module (CAM) web interface program, and the CAM web service program interoperate with one another to transfer large amount of data in web service transactions, in accordance with the embodiments of the present invention.

FIG. 2 is a control flow chart describing how the client program, the CAM web interface program, and the CAM web service program interoperate with one another to transfer large amount of data in web service transactions, in accordance with the embodiments of the present invention.

The web service calls of the present invention comprise a RequestSession web service call and a GetSessionResult web service call. The client program executes the RequestSession web service call to establish a CAM user session on the CAM web interface program for the client program. After the CAM user session is established, the CAM web interface program takes control over from the client program. The CAM user session is terminated upon a request by a user interacting with the CAM web interface program. The client program takes control back from the CAM web interface program and executes the GetSessionResult web service call to obtain accounting data modified during the CAM user session from the CAM data store. See FIG. 2A, infra, for details of steps 210, 220, 230, 250, 260, and 270, performed by the client program. See FIG. 2B, infra, for details of steps 330, 340, 345, and 350, performed by the CAM web interface program. See FIG. 2C, infra, for details of steps 410, 420, 460, and 470, performed by the CAM web service.

Figure 2A:
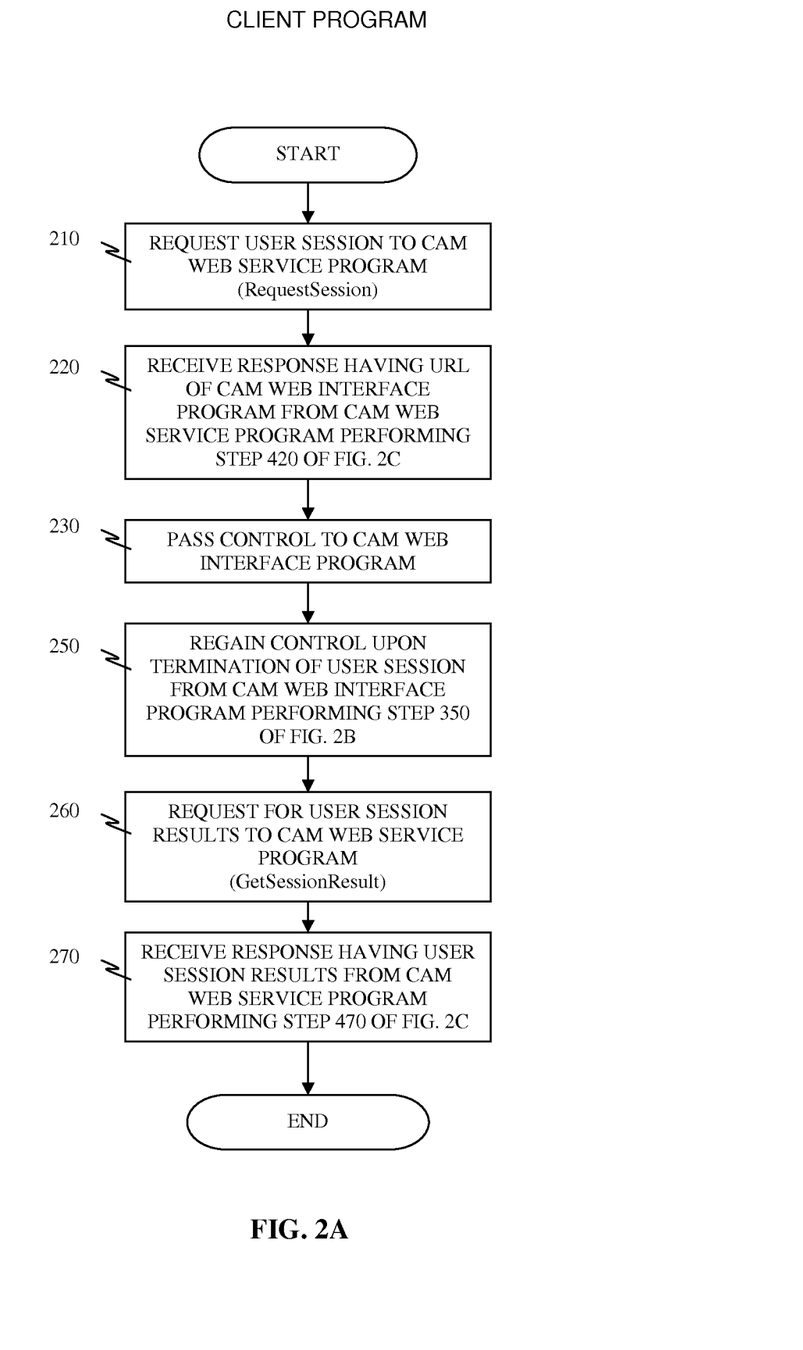
FIG. 2A is a flowchart depicting a method for transferring large amount of data in web service transactions performed by the client program, in accordance with the embodiments of the present invention.
Figure 2B:
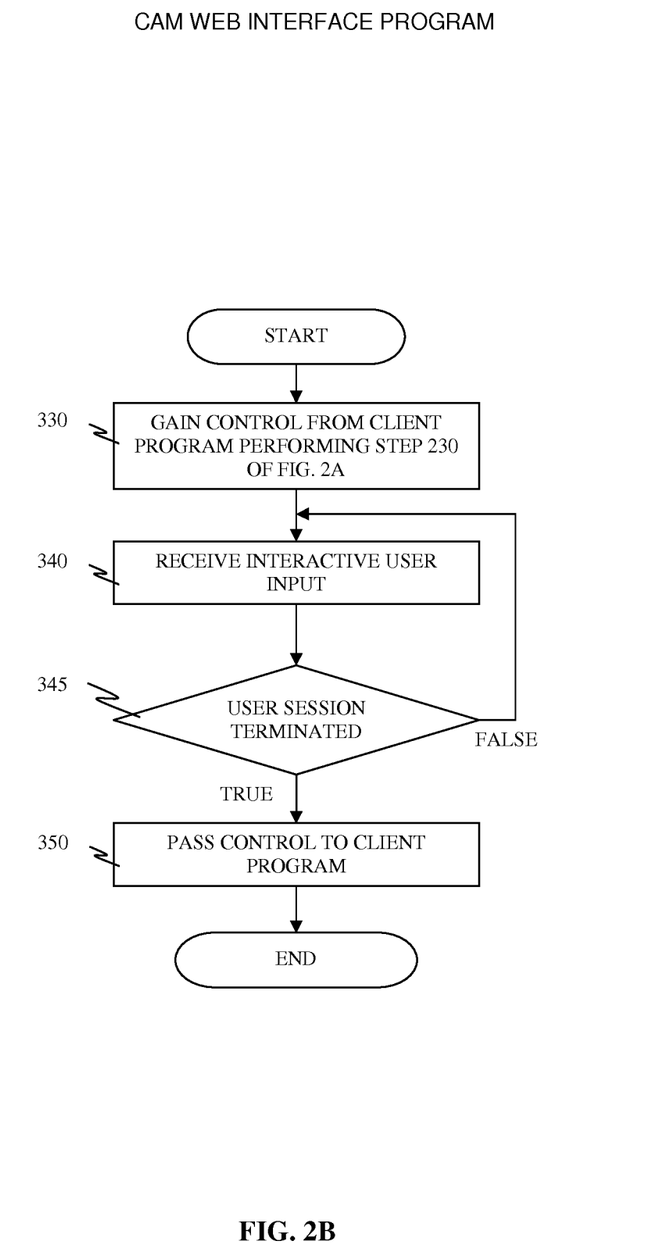
FIG. 2B is a flowchart depicting a method for transferring large amount of data in web service transactions performed by the CAM web interface program, in accordance with the embodiments of the present invention.
Figure 2C:
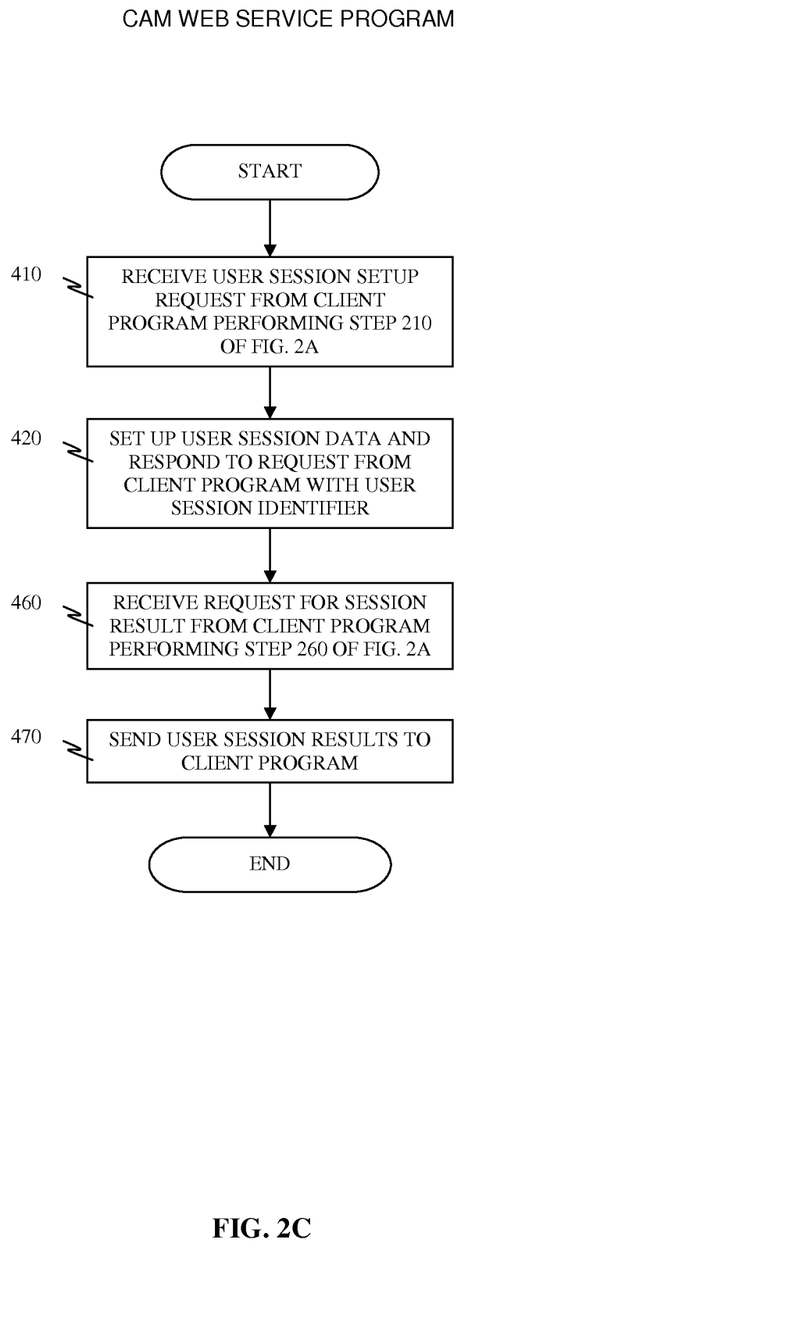
FIG. 2C is a flowchart depicting a method for transferring large amount of data in web service transactions performed by the CAM web service, in accordance with the embodiments of the present invention.

The CAM web service program of FIG. 2C, infra, and the CAM web interface program of FIG. 2B, infra, are independent of one another in terms of respective functionalities. The CAM web application handles only user interface, while the CAM web service program initializes the CAM user session, and the purchasing document through operations upon the CAM data store.

FIG. 2A is a flowchart depicting a method for transferring large amount of data in web service transactions performed by the client program, in accordance with the embodiments of the present invention.

The client program is a web application that a user interacts with to use the services provided by the CAM web service. The client program uses a pair of web service calls to establish a CAM user session and to retrieve a result of the CAM user session.

In step 210, the client program sends a request for a CAM user session to the CAM web service program by executing a RequestSession web service call. In this specification, the term CAM user session and the term a CAM session are used interchangeably. The RequestSession web service call passes, from the client program to the CAM web service, a purchasing document comprising data items to be serviced by the CAM web service, and a ReturnToURL representing a Uniform Resource Locator (URL) of the client program that a thread of execution must return after the CAM user session is terminated. In this specification, a thread of execution and a control are used interchangeably.

In step 220, the client program receives a response of the RequestSession web service call from the CAM web service program that performs step 420 of FIG. 2C, infra. The response to the RequestSession web service call comprises a URL of the CAM web interface program that has a parameter with a value of a session identifier sent by the CAM web service program performing step 420 of FIG. 2C, infra.

In step 230, the client program passes the control to the CAM web interface program as located by the URL of the CAM web interface program of step 220.

In step 250, the client program regains control from the CAM web interface program after the user of the client program terminates the CAM user session.

In step 260, the client program sends a request for results of services performed during the CAM user session by executing a GetSessionResult web service call. The GetSessionResult web service call requests information on which action the user have taken to terminate the CAM user session and the purchasing document with accounting data provided during the CAM user session if the user session was terminated with a "save" action to keep the data provided during the user session.

In step 270, the client program receives a response to the request of step 260 from the CAM web service program that performs step 450 of FIG. 2C, infra. The response comprises accounting information that is modified during the CAM user session.

FIG. 2B is a flowchart depicting a method for transferring large amount of data in web service transactions performed by the CAM web interface program, in accordance with the embodiments of the present invention.

In step 330, the CAM web interface program acquires control from the client program that performs step 230 of FIG. 2A, supra. The CAM web interface program operates for the CAM user session established through steps 210, 410, 420, and 220 as shown in FIG. 2, supra.

During the CAM session, the CAM web interface program presents, to the user of the caller application, a series of user interface screens for CAM accounting operations and receives inputs from the user. The user provides information applicable to the purchasing document that has been stored in the CAM data store by the CAM web service program performing step 410 of FIG. 2C, infra.

In steps 340 and 345, the CAM web interface program receives an input from a user of the client program until the CAM web interface program is terminated by the user.

In step 350, the CAM web interface program passes the control back to the client program pursuant to a value of the ReturnToURL as stored in InstAppl_Id attribute of the TCAM_User_Session row. See FIG. 3, infra, for details of the TCAM_User_Session row.

FIG. 2C is a flowchart depicting a method for transferring large amount of data in web service transactions performed by the CAM web service, in accordance with the embodiments of the present invention.

In step 410, the CAM web service program receives a request to set up a CAM user session from the client program performing step 210 of FIG. 2A, supra. The request comprises a ReturnToURL data that is a URL of the client program. The ReturnToURL is used for the CAM web service program to redirect a control to the client program after the CAM user session is completed. The CAM web service program also receives a purchasing document from the client program performing step 210. The CAM web service program stores the ReturnToURL and the purchasing document in the CAM data store to service the CAM user session.

In step 420, the CAM web service program generates and sends a response to the RequestSession web service call.

Upon receiving the request, the CAM web service program generates a session identifier of a new CAM user session and inserts a record of the CAM user session in a session data table with the session identifier. The response to the client program comprises the generated session identifier and a URL of the CAM web interface program. The client program subsequently redirects the user's browser to the URL of the CAM web interface program, passing the session identifier as a parameter.

In one embodiment of the present invention, the CAM user session of the user of the client program is represented as the TCAM_User_Session row.

In step 460, the CAM web service program receives a request to provide a result of the CAM user session from the client program that performs step 260 of FIG. 2A, supra.

In step 470, the CAM web service program sends the result of the CAM user session to the client program in response to the request received in step 460. The CAM web service program cleans up the CAM data store by removing the CAM user session data and the purchasing document.

Figure 3:
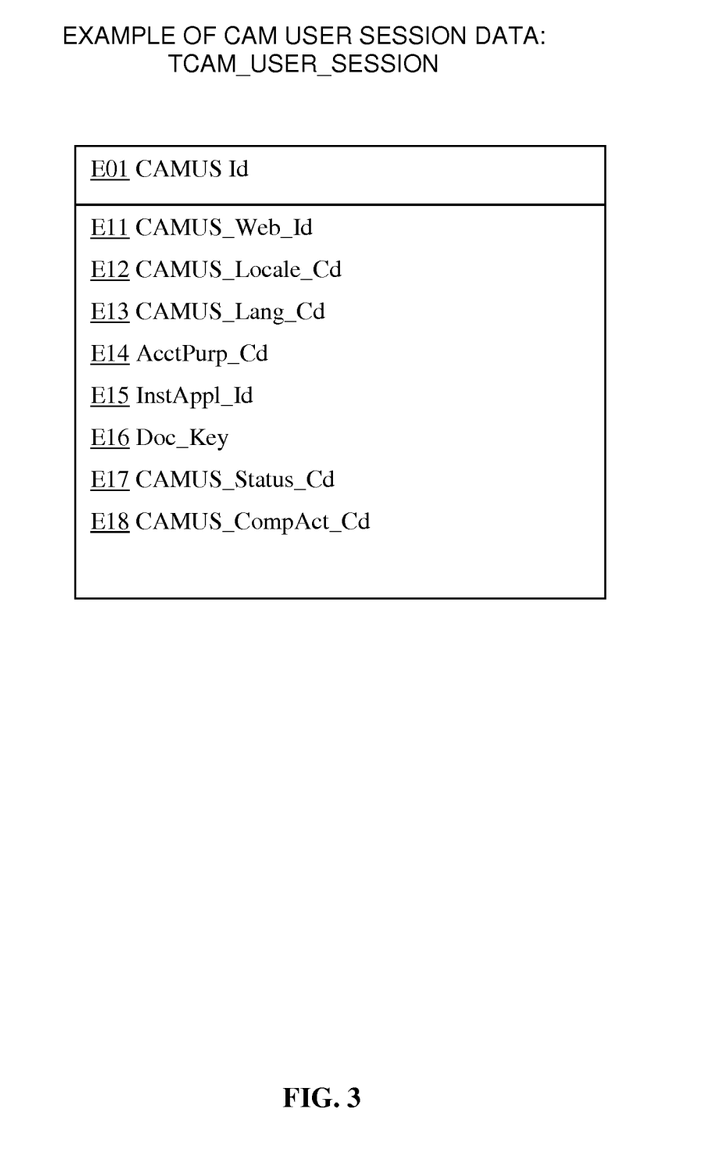
FIG. 3 is an example of the CAM user session data structure TCAM_User_Session, in accordance with the embodiments of the present invention.

FIG. 3 is an example of the CAM user session data structure TCAM_User_Session, in accordance with the embodiments of the present invention.

TCAM_User_Session is a table comprising a respective row for each active session. There can be multiple concurrent sessions at any point in time. Each active session comprises attributes shown in lines E01, E11 to E18 of FIG. 3.

In line E01, CAMUS Id represents an identifier generated at the point the client program, such as IBM® Buy On Demand program, calls the Common Accounting Module (CAM) at this time a user session (CAMUS) is established. (IBM is a registered trademark of International Business Machines Corporation in the United States and other countries.) The CAMUS Id identifier provides a linkage between an end-user, the client program and the document (or business transaction) for which accounting data elements are being collected.

In line E11, CAMUS_Web_Id represents an identifier used to log onto the web to ensure that a user is authentic. The CAMUS_Web_Id uniquely identifies a user of the system.

In line E12, CAMUS_Locale_Cd represents a geopolitical area contained within and defined by one and only one Country and describes cultural convention. A Country may define many Locales. Cultural conventions may include, inter alia, date and time formats, monetary and non-monetary numeric formatting, collating preferences, and official or tolerated language. The locale is defined in the client program and utilized in the CAM user session. The CAM is configured such that the CAM can support the aggregated list of locales defined in all client programs that call the CAM and present information in the language and format desired by a user.

In line E13, CAMUS_Lang_Cd represents an expected language translation that a user is presented. The CAMUS_Lang_Cd is defined by the client program. The CAM is configured such that the CAM can support the aggregated list of translations defined in all client programs that call CAM.

In line E14, AcctPurp_Cd represents a business scenario or condition that affects how a user may interact with the Common Accounting Module (CAM). Various purposes for the CAM is invoked for may be, inter alia, "Create" in which an initiator wishes to provide accounting information for items that has been created, "Create" in which an initiator wishes to edit accounting he previously entered, "Alter" in which an initiator wishes to edit accounting for an item he is altering and resubmitting, and "PFA/FIN Approval" in which a Financial approver wishes to view and potentially edit/correct accounting that was submitted, etc.

In line E15, InstAppl_Id represents the application, i.e., the client program, which called the Common Accounting Module (CAM). In order to appear in this session data, the application must be configured for CAM usage.

In line E16, Doc_Key represents an aggregate attribute composed of one or more pieces of data that uniquely identify the document or transaction within a specific instance of an application system. This information ensures that the provided Doc_Key document key is unique across multiple systems which submit documents to CAM for accounting.

In line E17, CAMUS_Status_Cd represents a system level perspective on the User Session. For example, the CAM system may recognize a status of the User Session as "Active," "Complete," or "Aborted." "Complete" represents a status resulting from an action of a user, and "Aborted" is a status when a time-out event has occurred.

In line E18, CAMUS_CompAct_Cd represents a "completion action" that a user took to complete the accounting session. The completion actions may be, inter alia, "Cancel" that the user terminated the session without saving the session, "Save/Incomplete" that the user saves an incomplete accounting session followed by returning control and accounting information to the client program, "Save/Complete" that the user has finished providing all needed accounting information which has been validated and is complete, followed by returning control and accounting information to the client program.

Figure 4:
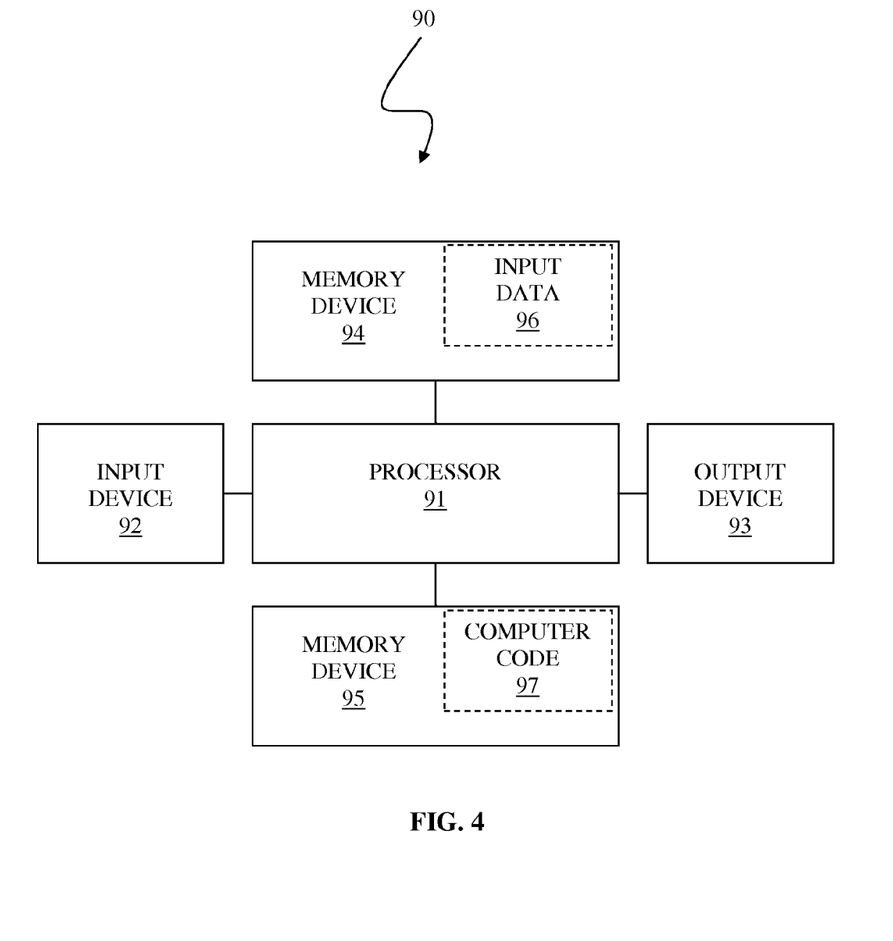
FIG. 4 illustrates a computer system used for transferring large amount of data in web service transactions, in accordance with embodiments of the present invention.

FIG. 4 illustrates a computer system 90 used for transferring large amount of data in web service transactions, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for transferring large amount of data in web service transactions according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for transferring large amount of data in web service transactions of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for transferring large amount of data in web service transactions.

In another embodiment, the invention provides a business method that performs the process steps of the invention on a subscription, advertising and/or fee basis. That is, a service provider, such as a Solution Integrator, can offer to create, maintain, support, etc. a process for transferring large amount of data in web service transactions of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for receiving an unlimited number of data items modified by a Web transaction, the method comprising:

a processor of a computer system directly requesting a service from a Web-service program, wherein the request comprises a set of accounting data items organized into a purchasing document and further comprises a client identifier, wherein the client identifier comprises information that allows the Web-service program to locate and directly communicate to the processor and further allows a Web-interface program to locate and directly communicate to the processor, and wherein the Web-interface program is distinct from the Web-service program and is functionally independent of the Web-service program;

the processor receiving from the Web-service program a user-session identifier and a Web-interface program identifier, wherein the Web-interface program identifier comprises information that allows the processor to locate and directly communicate to the Web-interface program;

the processor initiating a user session as a function of the user-session identifier and the Web-interface program identifier and as a further function of a storage location of the purchasing document on an accounting-data storage device, wherein the initiating comprises a direct communication from the processor to the Web-interface program without involvement of the Web-service program, wherein the user session comprises direct communications between the processor and the Web-interface program without involvement of the Web-service program, and wherein the set of accounting data items is modified during the user session;

the processor directing the Web-interface program to store the modified set of accounting data items on the accounting-data storage device, wherein the processor does not directly access the accounting-data storage device, and wherein the directing is performed without involvement of the Web-service program;

the processor terminating the user session, wherein the terminating comprises a direct communication from the processor to the Web-interface program without involvement of the Web-service program;

the processor requesting a service result from the Web-service program, wherein the service result comprises the stored modified set of accounting data items, and wherein the request for a service result is communicated directly to the Web-service program without interaction between the processor and the Web-interface program; and the processor receiving the stored modified set of accounting data items directly from the Web-service program without involvement of the Web-interface program.

2. The method of claim 1, wherein the user session comprises a data-update communication communicated directly from the processor to the Web-interface program without involvement of the Web-service program, and wherein the data-update communication instructs the Web-interface program to update a first data item of the set of accounting data items without involvement of the Web-service program.

3. The method of claim 1, wherein the accounting-data storage device may be directly accessed either by the Web-interface program or by the Web-storage program, but may not be directly accessed by the processor.

4. The method of claim 1, wherein the processor runs a client program, wherein the client program is under control of a user, wherein the client program generates a unique user identifier, wherein the user session is initiated as a further function of the user identifier, and wherein the user identifier associates the user with the purchasing document and limits the ways that the user can interact with the purchasing document.

5. The method of claim 4, wherein the user identifier further identifies a status of the user session, and wherein an "Active" status indicates that the user session has been initiated but has not been terminated, a "Complete" status indicates that the user session was terminated by the user after the Web-interface program stored the modified set of accounting data items on the accounting-data storage device, and an "Aborted" status indicates that the user session was terminated by a time-out event without involvement by the user.

6. A computer program product, comprising a computer-readable hardware storage device having a computer-readable program code stored therein, said program code configured to be executed by a processor of a computer system to implement a method for receiving an unlimited number of data items modified by a Web transaction, the method comprising:

the processor directly requesting a service from a Web-service program, wherein the request comprises a set of accounting data items organized into a purchasing document and further comprises a client identifier, wherein the client identifier comprises information that allows the Web-service program to locate and directly communicate to the processor and further allows a Web-interface program to locate and directly communicate to the processor, and wherein the Web-interface program is distinct from the Web-service program and is functionally independent of the Web-service program;

the processor receiving from the Web-service program a user-session identifier and a Web-interface program identifier, wherein the Web-interface program identifier comprises information that allows the processor to locate and directly communicate to the Web-interface program;

the processor initiating a user session as a function of the user-session identifier and the Web-interface program identifier and as a further function of a storage location of the purchasing document on an accounting-data storage device, wherein the initiating comprises a direct communication from the processor to the Web-interface program without involvement of the Web-service program, wherein the user session comprises direct communications between the processor and the Web-interface program without involvement of the Web-service program, and wherein the set of accounting data items is modified during the user session;

the processor directing the Web-interface program to store the modified set of accounting data items on the accounting-data storage device, wherein the processor does not directly access the accounting-data storage device, and wherein the directing is performed without involvement of the Web-service program;

the processor terminating the user session, wherein the terminating comprises a direct communication from the processor to the Web-interface program without involvement of the Web-service program;

the processor requesting a service result from the Web-service program, wherein the service result comprises the stored modified set of accounting data items, and wherein the request for a service result is communicated directly to the Web-service program without interaction between the processor and the Web-interface program; and the processor receiving the stored modified set of accounting data items directly from the Web-service program without involvement of the Web-interface program.

7. The method of claim 6, wherein the user session comprises a data-update communication communicated directly from the processor to the Web-interface program without involvement of the Web-service program, and wherein the data-update communication instructs the Web-interface program to update a first data item of the set of accounting data items without involvement of the Web-service program.

8. The method of claim 6, wherein the accounting-data storage device may be directly accessed either by the Web-interface program or by the Web-storage program, but may not be directly accessed by the processor.

9. The method of claim 6, wherein the processor runs a client program, wherein the client program is under control of a user, wherein the client program generates a unique user identifier, wherein the user session is initiated as a further function of the user identifier, and wherein the user identifier associates the user with the purchasing document and limits the ways that the user can interact with the purchasing document.

10. The method of claim 9, wherein the user identifier further identifies a status of the user session, and wherein an "Active" status indicates that the user session has been initiated but has not been terminated, a "Complete" status indicates that the user session was terminated by the user after the Web-interface program stored the modified set of accounting data items on the accounting-data storage device, and an "Aborted" status indicates that the user session was terminated by a time-out event without involvement by the user.

11. A computer system comprising a processor, a memory coupled to said processor, and a computer-readable hardware storage device coupled to said processor, said storage device containing program code configured to be run by said processor via the memory to implement a method for receiving an unlimited number of data items modified by a Web transaction, the method comprising:

the processor directly requesting a service from a Web-service program, wherein the request comprises a set of accounting data items organized into a purchasing document and further comprises a client identifier, wherein the client identifier comprises information that allows the Web-service program to locate and directly communicate to the processor and further allows a Web-interface program to locate and directly communicate to the processor, and wherein the Web-interface program is distinct from the Web-service program and is functionally independent of the Web-service program;

the processor receiving from the Web-service program a user-session identifier and a Web-interface program identifier, wherein the Web-interface program identifier comprises information that allows the processor to locate and directly communicate to the Web-interface program;

the processor initiating a user session as a function of the user-session identifier and the Web-interface program identifier and as a further function of a storage location of the purchasing document on an accounting-data storage device, wherein the initiating comprises a direct communication from the processor to the Web-interface program without involvement of the Web-service program, wherein the user session comprises direct communications between the processor and the Web-interface program without involvement of the Web-service program, and wherein the set of accounting data items is modified during the user session;

the processor directing the Web-interface program to store the modified set of accounting data items on the accounting-data storage device, wherein the processor does not directly access the accounting-data storage device, and wherein the directing is performed without involvement of the Web-service program;

the processor terminating the user session, wherein the terminating comprises a direct communication from the processor to the Web-interface program without involvement of the Web-service program;

the processor requesting a service result from the Web-service program, wherein the service result comprises the stored modified set of accounting data items, and wherein the request for a service result is communicated directly to the Web-service program without interaction between the processor and the Web-interface program; and the processor receiving the stored modified set of accounting data items directly from the Web-service program without involvement of the Web-interface program.

12. The method of claim 11, wherein the user session comprises a data-update communication communicated directly from the processor to the Web-interface program without involvement of the Web-service program, and wherein the data-update communication instructs the Web-interface program to update a first data item of the set of accounting data items without involvement of the Web-service program.

13. The method of claim 11, wherein the accounting-data storage device may be directly accessed either by the Web-interface program or by the Web-storage program, but may not be directly accessed by the processor.

14. The method of claim 11, wherein the processor runs a client program, wherein the client program is under control of a user, wherein the client program generates a unique user identifier, wherein the user session is initiated as a further function of the user identifier, and wherein the user identifier associates the user with the purchasing document and limits the ways that the user can interact with the purchasing document.

15. The method of claim 14, wherein the user identifier further identifies a status of the user session, and wherein an "Active" status indicates that the user session has been initiated but has not been terminated, a "Complete" status indicates that the user session was terminated by the user after the Web-interface program stored the modified set of accounting data items on the accounting-data storage device, and an "Aborted" status indicates that the user session was terminated by a time-out event without involvement by the user.

* * * * *